United States Patent [19]

Baues

[11] 3,808,552
[45] Apr. 30, 1974

[54] ARRANGEMENT FOR CONTROLLABLY DEFLECTING THE DIRECTION OF OPTICAL RADIATION

[75] Inventor: Peter Baues, Krailling, Germany

[73] Assignee: Siemens Aktiengesellschaft, Berlin and Munich, Germany

[22] Filed: Nov. 20, 1972

[21] Appl. No.: 308,114

[30] Foreign Application Priority Data
Dec. 17, 1971  Germany.............................. 2162848

[52] U.S. Cl. .............................................. 331/94.5
[51] Int. Cl. ............................................... H01s 3/10
[58] Field of Search.................... 331/94.5; 350/160

[56] References Cited
UNITED STATES PATENTS

| | | | |
|---|---|---|---|
| 3,297,876 | 1/1967 | DeMaria | 331/94.5 |
| 3,443,243 | 5/1969 | Patel | 331/94.5 |
| 3,517,332 | 6/1970 | DeMaria | 331/94.5 |
| 3,663,890 | 5/1972 | Schulthess et al. | 331/94.5 |

*Primary Examiner*—William L. Sikes
*Attorney, Agent, or Firm*—Hill, Sherman, Meroni, Gross & Simpson

[57] ABSTRACT

An arrangement for controllably deflecting the direction of an optical radiation characterized by the optical resonator having a third mirror with an aperture interposed between the two mirrors forming the resonator to subdivide the resonator into a pair of partial resonators. One of the pairs of partial resonators contains the active laser material which is arranged with respect to the aperture so that only an axial beam can be developed in the material. The second of the pair of partial resonators contains a transverse mode coupler which may be electro-optically or an acousto-optically modulated crystal with either a phase or amplitude grating or an electrically stimulated diaphragm and one of the resonator mirrors coacting with the mirror having an aperture is provided with a cut out to enable the emitting of a light beam in a fixed angular direction from the beam axis of the resonator.

15 Claims, 4 Drawing Figures

ARRANGEMENT FOR CONTROLLABLY DEFLECTING THE DIRECTION OF OPTICAL RADIATION

BACKGROUND OF THE INVENTION

1. Field of the Invention:

The present invention is directed to an arrangement for controllably deflecting the direction of optical radiation as it is emitted from the optical resonator containing an active material such as an active laser material.

2. Prior Art:

In optical data processing, devices are required which will deflect light beams such as laser beams in specific directions. A change between two arbitrary positions or directions of the light beams should be effected as quickly as possible during processing of optical data. In addition, a high resolving power, for example a large number of distinguishable directions per solid angle, is required for the beam.

Presently known devices for controlling the direction of a beam utilize a beam deflector, which is located outside of the optical resonator of the laser device, to produce the different beam directions. Examples of different types of beam deflectors are discussed in an article by V. J. Fowler and J. Schlafer entitled "A Survey of Laser Beam Deflection Techniques" Applied Optics, Vol. 5, No. 10, 1966, pages 1675-1682. These beam deflecting devices utilize mechanical or electrically controlled deflector systems and have only limited efficiency. Furthermore, these systems produce a small amount of deflection and thus produce a small number of directions on which the beam can be deflected.

SUMMARY OF THE INVENTION

The present invention is directed to an arrangement or device for controllably deflecting the direction of optical radiation as it is emitted from an optical resonator as a beam of light with a particularly high efficiency. In controlling the beam direction, the arrangement has a high switching speed between two arbitrary beam directions and can control a beam having the power of a few watts. To accomplish this, the device or arrangement includes a pair of reflecting means arranged to produce an optical resonator and has a mirror provided with an aperture disposed between the two deflecting means to subdivide the resonator into a pair of partial resonators. The first of the pair of partial resonators has the active laser material disposed therein and arranged so that only the axial beam can be developed in an active material and the second of the partial resonators is provided with a controllable transverse mode coupler, which controls the beam being emitted from the resonator. The transverse mode coupler can be an electrically stimulated diaphragm disposed perpendicular to the direction of propagation of the light beam in the partial resonator or a modulated crystal which is either an electro-optical crystal or an acousto-optical crystal and which crystal has either a phase or amplitude grating. When using a crystal, the boundary faces through which the light beam passes are either provided with an anti-reflex coating matched to the wave length used or the faces are arranged at the Brewster angle to the direction of propagation of the light. Preferably, the second partial resonator which contains the transverse mode coupler is a concentric resonator with the mode coupler located at the point of coincidence between the radii of curvature of the mirrors forming the partial resonator. To enable the emission of the beam, the reflecting means associated with the mirror has a cut out portion which is dimensioned so that axial beams passing through the partial resonator are fully reflected.

DESCRIPTION OF THE PREFERRED EMBODIMENT

Figure 1:
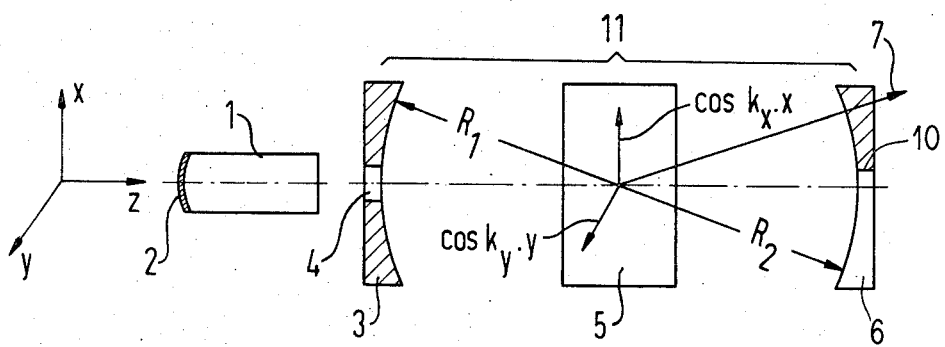
FIG. 1 schematically illustrates a first embodiment of the arrangement in accordance with the present invention.

The principles of the present invention are particularly useful in an arrangement or device illustrated in FIG. 1 which device makes it possible to couple a single beam of light out of the interior of an optical resonator in the desired direction. As illustrated in FIG. 1, an active laser material is provided with a highly reflective coating 2 on one end which coating forms one optical reflecting means which cooperates with a second optical reflecting means such as a mirror 6 to form an optical resonator. A perforated mirror 3 having an aperture 4 is disposed between the optical reflecting means 2 and 6 to subdivide the resonator into a pair of partial resonators with one partial resonator containing the active laser material 1. The second partial or subsidiary resonator 11 is provided with a controllable transverse mode coupler 5 which is an element in which the spatial properties, that are responsible for the propagation of light, fluctuate locally and in time.

The active laser material 1 may be, for example, a Nd-doped YAG rod which as mentioned above has one end provided with the highly reflective coating 2 which coating has the highest possible reflection factor. The opposite end of the rod 1 is provided with anti-reflex coating suitable for the particular wave length of the light being emitted during exciting or pumping of the rod 1. Conventional means for pumping or exciting the active laser material 1 are provided in the partial resonator containing the rod 1; however, for the clarity of the invention they are not illustrated.

During operation, laser radiation which is amplified in the laser active material 1 is injected through the aperture 4 into the partial resonator 11. The aperture 4 is so dimensioned by the diameter of the aperture 4 being smaller than the diameter of the rod 1 of laser active material and the mirror 3 containing the aperture 4 is positioned with regard to the active material 1 so that only an axial beam can be developed in the active material and all of the non-axial beams of radiation remain in the partial resonator 11.

The mirror 3 has a curved surface with a radius of curvature of $R_1$ which surface faces the coupler 5 and has a reflective coating having the highest possible reflection factor. In a similar manner, the mirror 6 has a curved surface with the radius of curvature $R_2$ facing the coupler 5 and this curve surface has a reflection factor of approximately 100 percent for the wave length of the radiation produced by the laser. To provide this reflection factor, a highly reflective coating, such as used on the mirror 3, can be utilized.

As the beam of light passes through the aperture 4 of the mirror 3 and enters into the partial resonator 11, it passes through the transverse mode coupler 5 which for example has a refractive index variation corresponding to the cos $k_x x$ in the x-direction and a cos $k_y y$ in the y-direction. This kind of refractive index variation can, for example, be produced by using either an acousto-optical or an electro-optical effect in a suitable crystal. The acousto-optical effect can be produced in crystals such as $\alpha$ - $HIO_3$ or $PbMoO_4$ crystals. For producing the electro-optical effect a KTN crystal can be used. The boundary faces of the crystal forming the transverse mode coupler 5 through which the light beam passes will be coated with an anti-reflex layer which is effective for the wave length of the light produced by the laser active material 1.

Figure 2:
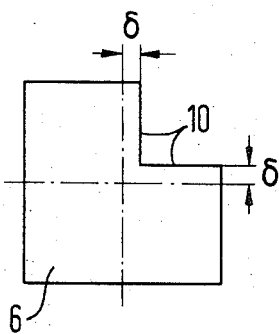
FIG. 2 illustrates a plan view of one of the resonator mirrors.

When a wave propagating in the direction $k_z$ enters the transverse mode coupler 5 in the z-direction, plane waves, which have diffraction orders $(m,n)$ wherein $(m,n = 0, \pm 1, \pm 2 \ldots )$, are fed out of the coupler towards the mirror 6. The mirror 6 has a portion which enables a beam of certain diffraction orders to be emitted from the partial resonator 11 as a light beam 7 of a predetermined direction. As illustrated in FIG. 2, the portion is formed by a cut out portion 10, located at one of the corners of mirror 6 so only the beams having the desired diffraction orders $(m,n)$ can leave the partial resonator 11. All the other beams particularly the beams with the zero diffraction order and those beams with low diffraction orders, i.e. $M=0$ and $n=1$ or $n=0$ and $m=1$, are reflected by the mirror's reflective surface back toward the coupler 5. The cut out portion 10, illustrated in FIG. 2, is dimensioned so that the cut out portion does not extend right up to the x and y axes of the mirror and is spaced from the x and y axes by an interval $\delta$ which is slightly greater than one-half of a diameter of a zero order beam at the mirror 6. Thus, as illustrated in FIG. 2, the portion 10 has an area smaller than one fourth of the surface of the mirror 6.

All of the other beams, such as the beams of the zero order and those of a lower diffraction order, contain a larger amount of energy than the beam 7 and are reflected by the reflective surface of the mirror 6 back into the coupler 5. The energy of these beams is finally transferred through a mode coupling to the beam 7 having the desired diffraction order. This energy will for example in the case of a He-Ne laser be about 10 to 100 m W or in the case of a YAG:Nd$^{3-}$ laser about 1 to 100 watts continuous rating.

The deflection efficiencies of the transverse mode coupler may be less than 1 percent and therefore very low. If a laser produces a continuous rated output for example 1 watt, then the power flow through the interior of the partial resonator 11 will be about 100 watts when the output mirror has a 99 percent reflection factor. If the reflection factor of the output mirror is increased to 100 percent, the emitted beam 7 in the desired direction of $m = 1, n = 1$ will have a power of approximately 1 watt which is 1 percent of the internal power flow of 100 watts when the internal transverse mode coupler has a deflection efficiency of 1 percent.

The transverse mode coupler can be formed by an element in which a grating is formed by an electro-optical or acousto-optical means. These elements make it possible to achieve switching speeds between two arbitrary beam directions of approximately $10_{+}^{7}$ seconds. By adjusting the diffraction orders produces by the grating by externally controlling the modulation of the crystal by a modulation means, the kx and ky direction of the beam 7 is controlled and switched between different selected directions.

As illustrated in FIG. 1, the mirror 3 and the external mirror 6 form a concentric partial resonator 11. At the point where the centers of the radii of curvature $R_1$ and $R_2$ of the two mirrors coincide, the transverse mode coupler 5 is located. This means that the beam corresponding to those diffraction orders, which are not emitted as beam 7, are turned back on themselves and their energy is transferred essentially and in a gradual manner to the beam 7 which is emitted from the partial resonator.

The number of distinguishable directions N per radian depends upon the configuration of the partial resonator between the left-hand mirror 3 and the right-hand output mirror 6. Through the structure of this resonator, a beam diameter d at the location of the transverse mode couple 5 is determined. Whence $N = d/\lambda$. Here $\lambda$ is the wave length of the operation of the laser. For $\lambda = 1$ $\mu$m and $d = 2$mm, it follows that $N \approx 2000$ and thus an angle of 1° has about 30 distinguishable directions.

Figure 3:
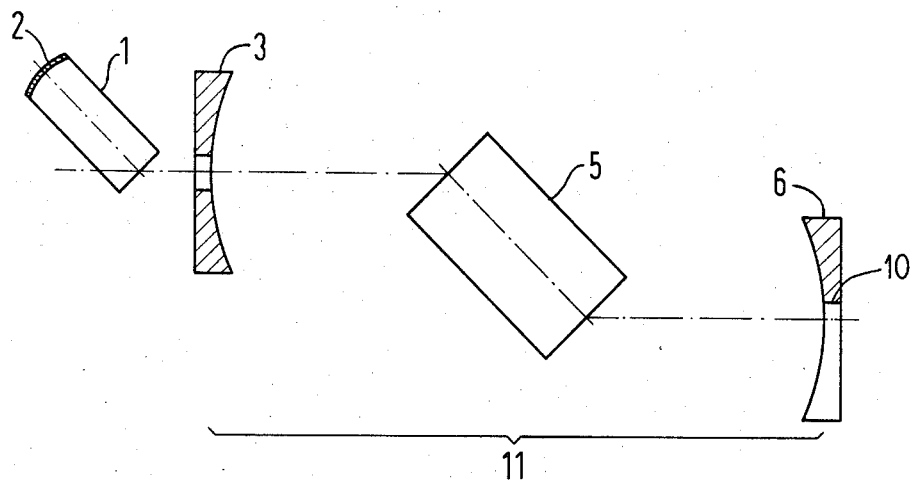
FIG. 3 is an advantageous arrangement of the transverse mode coupler and optical resonator.

In the schematic illustration of FIG. 3 the end rod of active laser material 1 remote from the reflecting means 2 is cut at the Brewster angle. Also, the boundary faces of the transverse mode coupler 5 through which the light beam passes are arranged at the Brewster angle to the direction of propagation of the light. With such an arrangement the surfaces do not require the coating with the anti-reflex material.

Figure 4:
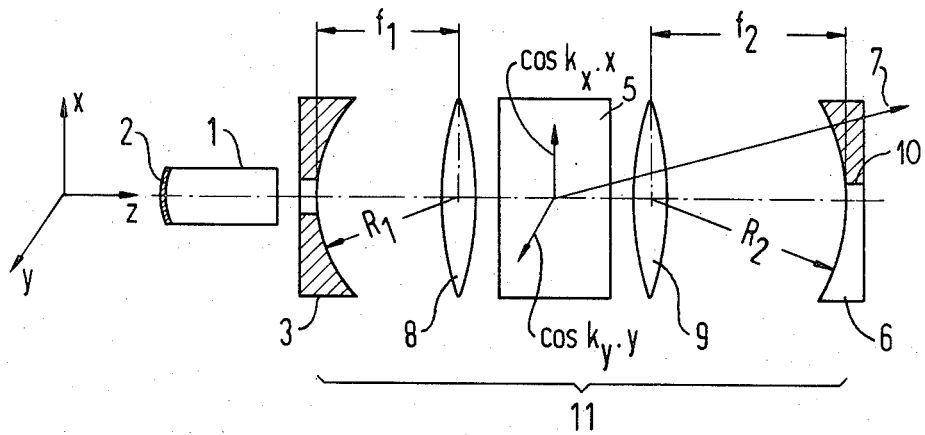
FIG. 4 is a second embodiment of the arrangement of the present invention.

An embodiment of the arrangement is illustrated in FIG. 4 and utilizes the same resonator mirrors 2, 6 plus the perforated mirror 3 provided with the aperture. The mirror 3 subdivides the resonator formed by the reflective coating 2 and the mirror 6 into the two partial resonators with the partial resonator 11 containing the transverse mode coupler. In addition to the transferred mode coupler 5, a pair of lenses 8 and 9 are disposed in the partial resonator 11 with the mode coupler 5 located between the lenses. The lens 8 has a focal length $f_1$ which is equal to the radius of curvature $R_1$ of the perforated mirror 3. The lens 8 is located at the center of the radius of curvature of the mirror 3 and receives light entering the partial resonator 11 through the aperture 4 of the perforated mirror 3 and converts it into a parallel beam to enter the transverse mode coupler 5. Light entering the transverse mode coupler leaves as plane waves with different diffraction directions. The lens 9 which has a focal length $f_2$ equal to the radius of curvature $R_2$ of the mirror 6, is located at the center of the radius of curvature $R_2$ and focuses these waves onto the mirror 6. The beam 7 of the desired diffraction order (m,n) is the effective beam and is emitted through the cut out portion 10 of the mirror 6. As in the previously described embodiment, the cut out portion 10 does not reach to the x and y axes and thus prevents any beam of zero order diffraction from leaving the partial resonator 11. Because the focal length $f_2$ of the lens 9 is equivalent to the radius $R_2$ of the mirror 6, the beams of the reflected diffraction orders are turned back on themselves. Thus their energy is gradually converted to the energy of the desired diffraction order which exists as the beam 7.

The partial resonator 11 between the perforated mirror 3 and the resonator mirror 2 is so designed that a point light source located at the aperture 4 of the mirror 3 will pass back and forth within the active medium 1 and is reproduced on itself. This gives the transverse mode coupler 5 a wide lightfield to increase the number of distinguishable directions. The width of the lightfield may be made very large by an appropriate choice of the resonator parameters. With the laser wave length of $\lambda = 1$ $\mu$m up to 90 distinguishable directions per degree can be achieved. As in the previous embodiment, the end of the rod 1 opposite the reflective coating 2 and the boundary faces of the coupler 5 are provided with an anti-reflex coating. Such a coating can be applied by a vapor deposition of a coating material for the particular operational wave length of the laser device.

Additional lenses 8 and 9 of the partial resonator can be dispensed with if the boundary faces of the transverse mode coupler 5 through which the light beams pass are formed as suitable curved surfaces. It is also possible to dispense with the anti-reflex layers on the boundary faces of the transverse mode coupler 5 in this modification if the latter are arranged at the Brewster angle to the direction propagation of the light within the partial resonator 11.

Although minor variations and modifications might be suggested by those skilled in the art, it should be understood that I wish to embody within the scope of the patent granted hereon all such modifications as reasonably and properly come within the scope of my contribution to the art.

I claim:

1. An arrangement for controllably deflecting the direction of optical radiation in discrete directions as it is emitted from an optical resonator as a beam of light, comprising a pair of optically reflecting means arranged to define an optical resonator, a mirror having an aperture being disposed between the pair of optical reflecting means to create a pair of partial resonators, laser active material being disposed in one of said pair of partial resonators and being arranged relative to said aperture so that only an axial beam of radiation can be developed in the laser active material, a transverse mode coupler being disposed in the second of said pair of partial resonators, said transverse coupler having spatial properties, which are responsible for the propagation of light and which are capable of both locally and timewise modulation, and means for modulating said properties of said transverse mode coupler.

2. An arrangement according to claim 1, wherein the transverse mode coupler is a crystal in which a grating can be created by means of a voltage applied to the external surface of the crystal, and wherein said means for modulating applies an external control voltage to modulate the crystal.

3. An arrangement according to claim 2, wherein the boundary faces of the crystal through which the light passes are provided with an anti-reflex coating matched to the particular light wave length of the radiation.

4. An arrangement according to claim 2, wherein the boundary faces of the crystals through which the light beam passes are disposed at the Brewster angle to the direction of propagation of the light.

5. An arrangement according to claim 2, wherein the optical reflecting means cooperating with the mirror to form the second partial resonator is a mirror having a cut out portion in one corner.

6. An arrangement according to claim 5, wherein the cut out portion in the mirror forming one of the optical reflecting means is smaller than one fourth of the surface of the mirror.

7. An arrangement according to claim 2, wherein the crystal is an acousto-optical crystal with a phase grating.

8. An arrangement according to claim 2, wherein the crystal is an acousto-optical crystal with an amplitude grating.

9. An arrangement according to claim 2, wherein the crystal is an electro-optical crystal with a phase grating.

10. An arrangement according to claim 2, wherein the modulated crystal is an electro-optical crystal with an amplitude grating.

11. An arrangement according to claim 1, wherein the second partial resonator which contains the transverse mode coupler is a concentric resonator with mirrors having a radius of curvature and wherein the transverse mode coupler is disposed at a point at which the centers of the radii of curvature coincide.

12. An arrangement according to claim 1, wherein the aperture of the mirror is on the axis of the partial resonator.

13. An arrangement according to claim 1, wherein the optical reflecting means cooperating with the mirror to form the second partial resonator containing the transverse mode coupler has a corner portion removed.

14. An arrangement according to claim 13, characterized in that the corner portion in the external mirror is smaller than one fourth of the surface of the mirror.

15. An arrangement according to claim 13, wherein the edges of the corner portion are spaced from the $x$ and $y$ axes of the reflecting means by a distance slightly greater than one half of a diameter of a beam passing axially through the second partial resonator so that a beam passing axially through the second partial resonator is fully reflected.

* * * * *